(12) United States Patent
Kreitmeier et al.

(10) Patent No.: US 10,727,509 B2
(45) Date of Patent: Jul. 28, 2020

(54) METHOD FOR REPAIRING A FUEL CELL STACK

(71) Applicant: Bayerische Motoren Werke Aktiengesellschaft, Munich (DE)

(72) Inventors: Stefan Kreitmeier, Reichertshofen (DE); Stefan Haase, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 232 days.

(21) Appl. No.: 15/995,325

(22) Filed: Jun. 1, 2018

(65) Prior Publication Data

US 2018/0277866 A1 Sep. 27, 2018

Related U.S. Application Data

(63) Continuation of application No. PCT/EP2016/076379, filed on Nov. 2, 2016.

(30) Foreign Application Priority Data

Dec. 2, 2015 (DE) .................. 10 2015 224 088

(51) Int. Cl.
*H01M 8/04223* (2016.01)
*H01M 8/04664* (2016.01)
*H01M 8/04858* (2016.01)
*H01M 8/1018* (2016.01)

(52) U.S. Cl.
CPC ... *H01M 8/04246* (2013.01); *H01M 8/04671* (2013.01); *H01M 8/04873* (2013.01); *H01M 8/04951* (2016.02); *H01M 2008/1095* (2013.01)

(58) Field of Classification Search
CPC ......... H01M 8/04246; H01M 8/04951; H01M 8/04671; H01M 8/04873; H01M 2008/1095
See application file for complete search history.

(56) References Cited

U.S. PATENT DOCUMENTS

| 4,252,869 | A | * | 2/1981 | Heitz | ............ H01M 2/34 337/21 |
| 4,761,350 | A | * | 8/1988 | Ide | ............ H01M 8/04223 429/49 |
| 7,078,119 | B2 | | 7/2006 | Takahashi | |
| 2005/0019630 | A1 | | 1/2005 | Walliser | |
| 2016/0011071 | A1 | * | 1/2016 | Wilson | ............ G01M 3/226 73/40.7 |

FOREIGN PATENT DOCUMENTS

| DE | 10 2009 026 563 A1 | 12/2010 |
| DE | 10 2013 004 838 A1 | 9/2013 |
| EP | 1 492 189 A1 | 12/2004 |

OTHER PUBLICATIONS

International Search Report (PCT/ISA/210) issued in PCT Application No. PCT/EP2016/076379 dated Mar. 1, 2017 with English translation (seven pages).

* cited by examiner

*Primary Examiner* — Muhammad S Siddiquee
(74) *Attorney, Agent, or Firm* — Crowell & Moring LLP

(57) ABSTRACT

A method for repairing a fuel cell stack having a plurality of individual cells involves the steps of: a) identifying at least one degraded individual cell in the fuel cell stack; and b) deactivating the at least one degraded individual cell.

15 Claims, 2 Drawing Sheets

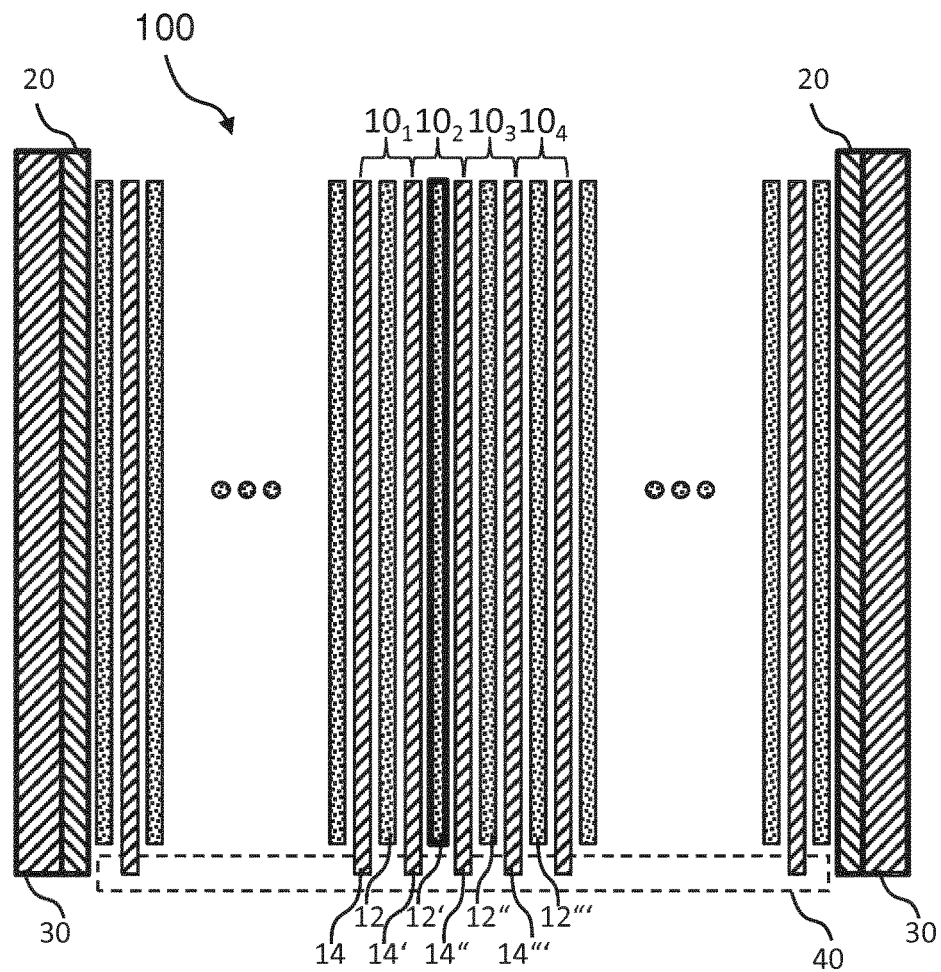
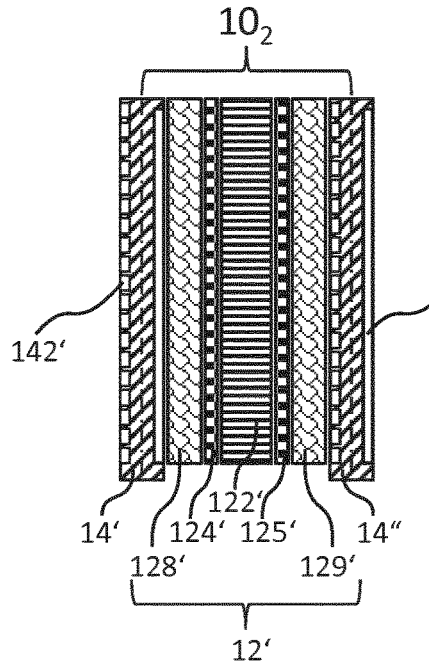
Fig. 2
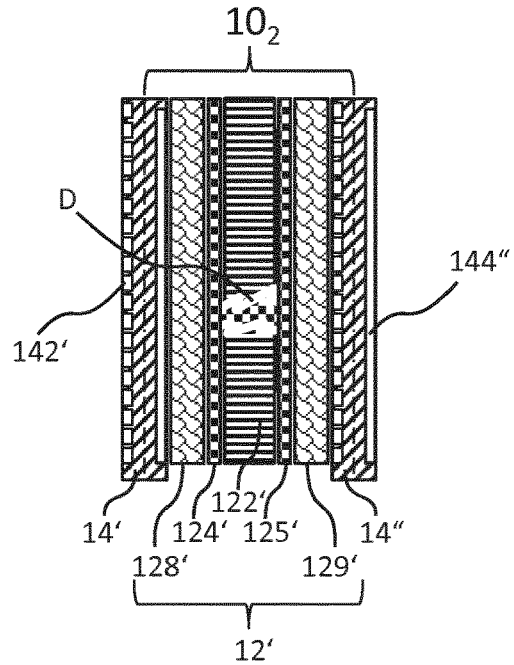
Fig. 3

METHOD FOR REPAIRING A FUEL CELL STACK

CROSS REFERENCE TO RELATED APPLICATIONS

This application is a continuation of PCT International Application No. PCT/EP2016/076379, filed Nov. 2, 2016, which claims priority under 35 U.S.C. § 119 from German Patent Application No. 10 2015 224 088.6, filed Dec. 2, 2015, the entire disclosures of which are herein expressly incorporated by reference.

BACKGROUND AND SUMMARY OF THE INVENTION

The technology disclosed here relates to a method for repairing a fuel cell stack.

Fuel cell systems are known. They comprise a fuel cell stack with a variety of fuel cells or individual cells connected in series (hereinafter, for the sake of simplicity, the term individual cells or cells will be used). The performance of the fuel cell stack is limited by the individual cell with the lowest current density at a given voltage. Following an event of damage, e.g. global fuel starvation, the current density of a single individual cell can be limited due to irreversible damage to the electrode so that the fuel cell stack can no longer provide the necessary minimum power for operating the vehicle. Even if only an individual cell or only a few individual cells can no longer provide the current necessary for the minimum power of the vehicle, the entire fuel cell stack must be deemed defective due to connecting the individual cells in series.

If an individual cell of a fuel cell stack is faulty, the fuel cell stack performance is limited by the worst or defective individual cell due to connecting all of the individual cells in series. As a result, the vehicle performance is limited, no power can be provided under certain circumstances. In both cases, the vehicle should be inspected by a specialized workshop. So far, it has been difficult to repair or replace individual defective cells in a fuel cell stack. In addition, the fuel cell stack would have to be taken from the vehicle and be opened, individual defective or degraded cells would have to be removed and, if necessary, be replaced with new ones. This process would be expensive and probably, it would require special tools, machines and facilities. Moreover, in-depth expertise for such repair would be necessary. With the existing infrastructure, a replacement of the entire fuel cell stack may be appropriate. The exchange of a faulty fuel cell stack for a new fuel cell stack is however expensive.

From U.S. Pat. No.7,078,119 B2, a fuel cell stack with multiple sub-stacks is known, where the temperature for the control of the stack is used.

It is the task of the technology disclosed here to eliminate or reduce the disadvantages of the prior solutions. More tasks result from the favorable effects of the technology disclosed here. The task(s) is/are solved by means of the object of the independent patent claims. The dependent claims represent preferred embodiments.

The technology disclosed here relates to a method for repairing a fuel cell stack. The fuel cell system with the fuel cell stack disclosed here has been, for example, developed for mobile applications, such as vehicles, in particular, to provide energy for the at least one drive machine to propel the vehicle. Such a fuel cell system comprises a variety of fuel cells. In its simplest form, an individual cell is an electrochemical energy converter, which converts fuel and oxidant into reaction products, thereby producing electricity and heat. The individual cell comprises an anode and a cathode, which are separated from each other by an ion-selective or ion-permeable separator. The anode has an intake for a fuel to the anode. Preferred fuels include: Hydrogen, low-molecular alcohol, organic fuels or liquefied natural gas. The cathode has, for example, an intake for an oxidant. Preferred oxidants include air, oxygen and peroxide for example. The ion-selective separator (hereinafter referred to as membrane in the following) can, for example, be designed as a proton exchange membrane (PEM). Preferably, a cation-selective polymer-electrolyte membrane is used. For example, materials for such a membrane include: Nafion®, Flemion® and Aciplex®.

The number of individual cells is based on the cell design and the required power of the fuel cell system. For example, the fuel cell stack can comprise at least 100, preferably at least 200, at least 300, at least 400, or at least 500 fuel cells or individual cells. The individual cells are consolidated into a single fuel cell stack, in particular, they are clamped between two end plates. The fuel cell stack furthermore comprises at least two current collectors. The current collectors are generally plates, which are led out of the fuel cell stack at least in sections (or corresponding electrical conductors are led out). The current collectors are additionally used to tap the current of an attached individual cell over a surface area and lead it away in the direction of a consumer. The fuel cell system here is designed in such a way that at least one defective individual cell can be selectively deactivated.

The method disclosed here comprises the following steps:
Identifying at least one degraded individual cell of the fuel cell stack; and
Deactivating the at least one degraded individual cell.

Thereby, a worsening of the state, in particular the performance of the individual cell is generally viewed as cell degradation. For example, cell degradation is assumed if, for example, the individual cell can provide less than 70%, preferably less than 50%, 30% or 20% of the nominal power or the average power of the non-degraded individual cells of the fuel cell stack. Rather than degraded individual cells, the term "defective fuel cells" could be used instead. Also, in this context, a damaged membrane can be viewed as a defective fuel cell.

Identifying at least one degraded cell can, for example take place by means of determining the cell degradation of the individual cells. Determining cell degradation can comprise the following step: Measuring the cell voltage of a plurality of individual cells. For example, the cell voltage can be used as a measurement for cell degradation. For example, an individual cell can be viewed as degraded if the individual cell can provide less than 70%, preferably less than 50%, 30% or 20% of the nominal voltage or of the average voltage of the other individual cells. In other words, there may be cell degradation if a cell has a lower cell voltage than the other individual cells of the fuel cell stack and/or the corresponding segment. Instead of the cell voltage, other parameters of the individual cell could be used, such as impedance, OCV testing, etc. The degradation of the cell can be determined during fuel cell operation continuously or intermittently (i.e. from time to time, particularly on a regular basis). Preferably, the cell degradation is not detected during the start-up phase of the fuel cell operation. In the start-up phase, in other words when the fuel cell system has not yet reached the operating temperature, ice formations could falsify the measuring result. Preferably, the at least one individual cell is only classified as degraded following a plurality of temporally offset measurements or in the case of deviations in the cell voltages that are greater than a previously-defined value. For example, a cell monitoring system (cell voltage monitor) can be used to identify and, preferably, also to locate at least one degraded individual cell. Furthermore, preferably, the degraded individual cell can also be identified or localized in a service facility by means of a suitable diagnostic device, for example by means of an external diagnostics unit.

In this context, deactivating can, in particular, mean that the cell does not contribute to the performance of the fuel cell stack or no longer influences it and, in particular, does not limit the current flow through the stack. The deactivation of at least one degraded individual cell comprises the electrical bridging of the individual cell in particular.

According to one aspect, the individual cell can be bridged externally, for example, by electrically bridging the separator plates of an individual cell. In other words, an electrical connection between the separator plates is permitted. The electrically conductive connection between two separator plates of the degraded individual cell can be generated through a membrane in a particularly advantageous manner. In this context, through the membrane means that either the membrane itself becomes electrically conductive and/or a passage is made in the membrane, which makes an electrical contact possible between catalyst layers, which are normally separated by the membrane and/or gas-diffusion layers. The passage can, for example, be a hole, a gap or a tear in the membrane. The fuel cell stack on the whole is pretensioned. Pre-tensioning ensures that the catalyst layers and/or gas-diffusion layers arranged on both sides of the membrane are pressed into the passage, wherein the components that are otherwise separated by the membrane then come into contact. If one or both catalyst layer(s) should, for some reason, not be present in the passage area through the membrane, one or both gas-diffusion layer(s) could establish the electrical contact to the other side of the membrane. The electrically conductive connection could alternatively or additionally be designed in such a way that the membrane itself is made electrically conductive, at least in areas, for example, by changing the membrane substance and/or by embedding an electrically conductive substance into the membrane.

In accordance with the method disclosed here, a high voltage can be applied to the individual cell that produces the passage. The high voltage is suitably chosen so that it results in a spark discharge and thereby to the formation of a passage. For example, the high voltage can be at least 1 kV or at least 5 kV, furthermore preferably at least 10 kV, at least 20 kV, or at least 30 kV. Preferably, the fuel cell stack is potential-free. For example, the fuel cell stack should not be connected to the ground potential of the motor vehicle. Preferably, it is ensured that no current between intact individual cells flows by applying the high voltage. In addition, the intact individual cells can be potential-free. For this purpose, the high voltage can be applied to the separator plates of the individual cell from the outer edge. If a cell monitoring system is used and it is designed to transfer the high voltage, the high voltage can also be applied via the cell monitoring system. Instead of an individual cell, it can, for example, also be provided that two or more directly adjacent individual cells are deactivated at the same time.

Alternatively or additionally to the high voltage, a membrane structure disintegrating substance may be introduced into the degraded individual cell. Thereby, the substance can change the structure of the membrane in such a way that the membrane becomes electrically conductive. Being especially preferable, the membrane is fully disintegrated, at least in sections so that the passage is formed. For example, a solvent, such as acetone, can be introduced into the individual cell, which dissolves the membrane at least in sections. Advantageously, a substance can be used, the dynamic viscosity of which is less than $1000 \; 10^{-6}$ kg m$^{-1}$ s$^{-1}$ at an atmospheric pressure and a temperature of 0° C., and particularly preferred, less than $500 \; 10^{-6}$ kg m$^{-1}$ s$^{-1}$ or less than $100 \; 10^{-6}$ kg m$^{-1}$ s$^{-1}$. Advantageously, the substance could be designed to disintegrate the structure of the catalyst layer. Then, the substance reaches the membrane more easily.

After the creating the passage or after the disintegration of the membrane at least in sections, the fuel cell stack can be operated in such a way that the passage enlarges. The passages created according to the aforementioned methods are initially generally small in comparison. For example, the passage can have a diameter of approx. 10 to approx. 100 µm. Such a passage may be enough that a first contact between the electrically conductive layers arranged on both sides of the membrane (i.e. the catalyst layer and a gas-diffusion layer) is established. There is a current flow through the membrane, which is, for example, approximately 10 to 20 milliamperes. This current flow causes a warming of the surrounding areas. In addition, fuel can come into contact with the oxidant through the passage. It can then come to a chemical reaction where heat is released. This reaction heat can also heat the surrounding areas. Advantageously, the reaction can be devised in such a way that the membrane is heated in the area of the passage so that the membrane can disintegrate or melt away, at least in sections. Advantageously, the contact area for the catalyst layers and gas-diffusion layers can thus enlarge by means of this. The enlarged contact area may be associated with increased electrical conductivity. The electrical conductivity can therefore be increased in such a way that performance degradations are low as a result of the line resistance of the deactivated individual cell. In particular, after the passage in the membrane or the contact surfaces has/have enlarged, preferably, the at least one media supply and/or at least one media discharge to the or from the individual cell can preferably be prevented. The method disclosed here can furthermore comprise the step, according to which the oxidant on the cathode side has a lower oxygen level than the ambient air during the deactivation of the individual cell. Thus, the chemical reaction on the passage can be better controlled and possibly prevented, if desired. For example, an oxygen level of less than 10 volume-% or 10 mass-% can be provided. The phase of deactivation comprises the repair time. The phase of deactivation does not comprise the regular operation of vehicles for transport.

Preferably, at least a media supply of the fuel cell stack into the degraded individual cell and/or at least a media discharge of the fuel cell stack from the degraded individual cell can be prevented. As a rule, three media are supplied: fuel, oxidant and coolant. The at least one media supply generally comprises a medium supply channel, a media inlet, through which the medium reaches into the individual cell and a distributor structure on the inlet side, which connects the media inlet to the active flow field. As well, the at least one media discharge generally comprises a distributor structure on the outlet side, which transports the medium from the active flow field into the media outlet, from where the medium then reaches the media discharge channel.

Being especially preferred, the fuel supply, the fuel discharge, the oxidant supply and/or the oxidant discharge is prevented to and from the individual cell, where, by contrast, preferably, the supply and the discharge of the coolant (if present) cannot be prevented. In the following, the fuel supply and the fuel discharge will be primarily dealt with. The technology explained here to prevent the fuel supply and the fuel discharge is also applicable to the supply and the discharge of oxidant and should be considered to be disclosed along with this.

The method disclosed here can comprise the step according to which the media inlet, the media outlet and/or their distributor structures are cast using a sealant, Here, any sealant can be provided, which can be introduced into the aforementioned areas of the individual cell and which do not let the medium (e.g. fuel, oxidant, etc.) through or only let it through in insignificant amounts. Advantageously, the sealant can be introduced at a temperature or during hardening assume such a temperature which disintegrates the membrane at least in sections. Thereby, for this purpose, the passage disclosed here can be achieved without any further interventions.

The method disclosed here can comprise the step according to which the sealant M is introduced into the media inlet, into the media outlet and/or into the distributor structures of the media inlet or the media outlet from the outer edge R. For this purpose, for example, the media supply and the media discharge channels can be designed to be directly adjacent to these elements, which can be sealed during regular operation by the ring seal of the individual fuel cells.

The method disclosed here can comprise the step according to which the media supply is prevented by means of a tool introduced through the media supply channel. The method disclosed here can comprise the step, according to which the media discharge is prevented by means of a tool that is introduced through the media discharge channel. In other words, for example the fuel supply or the fuel discharge can also be prevented by means of an endoscopic tool. For this purpose, the tool is designed to seal the elements of the media supply as well as the media discharge, for example by means of pouring. The method disclosed here can comprise the step, according to which an electrical potential is applied to the degraded individual cell and wherein the tool disclosed here can identify or localize the degraded individual cell by means of the electrical potential. Preferably, the potential can be applied via the cell monitoring system. Thereby, the tool can be positioned correctly in a quick and simple manner.

In other words, the technology disclosed here has the purpose that one or a plurality of defective (degraded) individual cell(s) of a fuel cell stack can be deactivated within the stack group (in particular, being bridged), without the fuel cell stack having to be opened in the process.

The minimally invasive interventions for repair are designed in such a way that they can be carried out by any specialist workshop without a great deal of effort. The minimally invasive interventions, in particular, can, for example, be described in detail as follows:

a) Ensuring the electrical flow of current through defective (degraded) cells To ensure the functionality of the fuel cell stack, the current should also be able to flow through defective cells. In intact (not degraded) cells, the current flow is ensured by the electrochemical reaction and the hydrogen proton line. The electric current flow is prevented by a membrane-electrode unit (also referred to as an MEA) through the membrane, which acts as an electrical insulator. In order to also ensure the flow of current within a defective or degraded cell (cells which cannot provide the required current by means of an electrochemical reaction), one or a plurality of holes can be inserted into the membrane. The MEA is short-circuited due to the holes. Electrons can flow through the holes in the membrane via the catalyst layer or the gas-diffusion layer. The current flow is guaranteed. The holes can be initiated within the membrane by means of electronic breakthrough for example. In addition, for this purpose, between the bipolar plates of a defective cell, a high voltage can be applied, wherein, preferably, the entire fuel cell stack could be isolated. Preferably, the high voltage should be selected in such a way that it results in an electronic breakthrough through the membrane (typically >1 kV). Initially, these holes can be small due to the production method. By operating the fuel cell stack, the hole(s) in the membrane can become larger, since, due to the high electrical resistance at the hole, the temperature increases and thereby the polymer of the membrane begins to melt or disintegrate at the hole. If a breakthrough is desired across two cells, this can also be carried out by applying potential at a middle bipolar plate.

b) Ensuring freedom from leaks, in particular, for the fuel path. Preferably, it should be ensured that no fuel continuously leaks from the defective (degraded) cells during normal operation and that no fuel penetrates into the areas enriched with oxygen. Preferably, this can be achieved by means of the following approach: A preferably quick hardening material is endoscopically introduced into the fuel distributor structure of the defective (degraded) cell (input and output) through the manifold on the fuel input and fuel output so that the cell is cut off from the fuel supply. The air flow could also be sealed.

The technology disclosed here describes a method with which a fuel cell stack with degraded cells can be made capable of continuing to operate within the vehicle despite degraded cells. Exchanging the complete fuel cell stack can possibly be avoided by means of this. Due to this relatively quick method, repair costs and repair times can possibly be reduced. Since the method is designed in such a way that it can be carried out in a professional facility, the defective fuel cell stack can be ready for operation again relatively quickly.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically illustrates a fuel cell stack 100.
FIG. 2 schematically illustrates a degraded individual cell $10_2$.
FIG. 3 schematically illustrates a degraded individual cell $10_2$ with passage D.

DETAILED DESCRIPTION OF THE DRAWINGS

Figure 4:
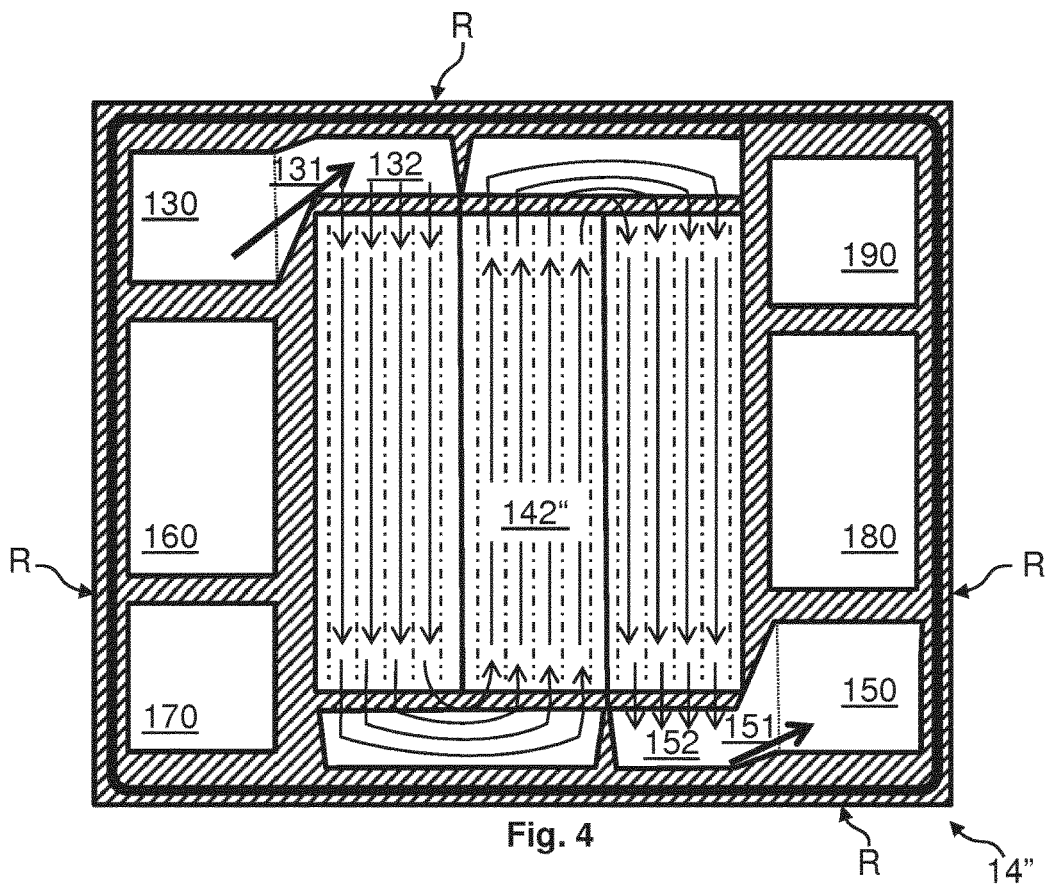
FIG. 4 schematically is a top view of a separator plate 14".

FIG. 1 schematically shows a fuel cell stack 100 with a variety of individual cells, of which the individual cells $10_1$, $10_2$, $10_3$, $10_4$ are shown as an example. The individual cells are held by two end plates 30 and pre-tensioned. Current collectors 20 are provided adjacent to the end plates. The separator plates are designed as bipolar plates 14, 14', 14", 14''' here. Together with a MEA 12, 12', 12", 12''', arranged between them, each half of two adjacent bipolar plates 14, 14', 14",14''' form an individual cell $10_1$, $10_2$, $10_3$, $10_4$. The bipolar plates shown are connected to a cell monitoring system 40 that is designed to monitor the state of the cells. The degraded individual cell $10_2$ is highlighted. In order to form a passage D, a high voltage of several kV can be applied to the separator plates 14', 14". Then a passage D is formed (cf. FIG. 3). If the adjacent individual cells $10_2$ and $10_3$ were degraded, the outer separator plates 14',14''' of the two degraded individual cells $10_2$, $10_3$, together with the separator plate 14" in between them could also be used to apply a high voltage so that this results in the breakthrough of the membranes 12' and 12" of the degraded individual cells.

FIG. 2 schematically shows a magnified detail of an individual cell $10_2$. It should be noted that the proportions of the individual layers are not true to scale. In the bipolar plates 14', 14", flow fields 142', 144' are provided, by means of which the fuel and the oxidant are distributed onto the reactive surface. The media then penetrate through the gas-diffusion layers 128', 129' to the catalyst layers 124', 125'. The catalyst layers 124', 125' both directly abut the membrane 122'.

FIG. 3 schematically shows a magnified detail of the individual cell $10_2$ according to the design of the passage D. Through the passage D, the catalyst layers 124', 125' provided on both sides of the membrane come into contact. If the fuel cell stack 100 or the degraded individual cell $10_2$ operate, the membrane heats up in the area of the passage D. The areas of the membrane, which are arranged directly adjacent to the passage D, gradually melt and the contact surface of the catalyst layers 124', 125' enlarge. In addition, due to a chemical reaction of the media, which come into contact with each other within the area of the passage, the membrane can heat up and ultimately melt. If the contact surface of the catalyst layers 124', 125' enlarge, the electric conductivity is improved by means of the individual cell to be deactivated.

FIG. 4 shows a top view of an anode side of the separator plate 14". The fuel supply channel 130, the fuel discharge channel 150, the oxidant supply channel 160, the oxidant discharge channel 180, the coolant supply channel 170 and the coolant discharge channel 190 run perpendicular to the drawing plane. These channels could also be arranged differently in the separator plate. In the following, the flow is explained based on the fuel path. However, the same principle can, so to speak, be applied to the oxidant path and/or the coolant path. The fuel passes through the fuel inlet 131 into the (pre-)distribution structure 132 on the inlet side. From there, it is distributed onto the flow field 142". The distributor structure 152 on the outlet side (it can also be referred to as a collection structure) leads the fuel to the fuel outlet 151, which flows into the fuel discharge channel 150.

Figure 5:
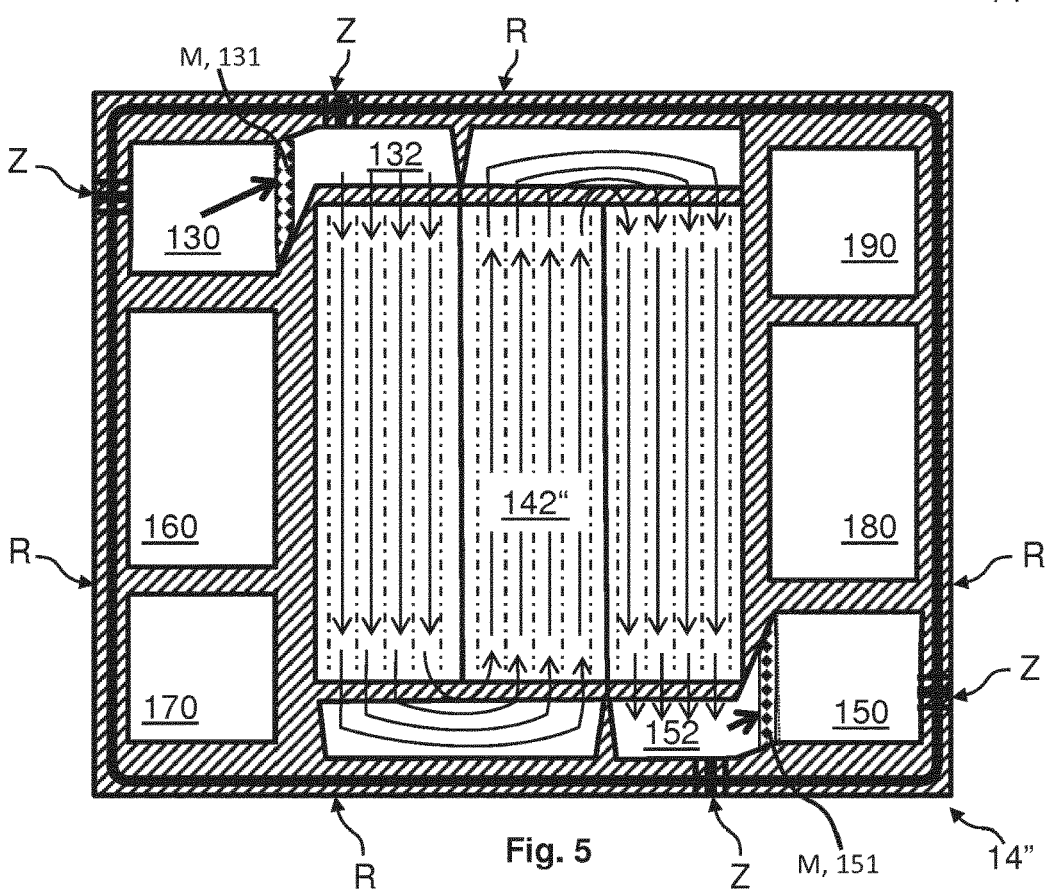
FIG. 5 schematically is a top view of a separator plate 14" with a cast fuel inlet 131 and a fuel outlet 151.

FIG. 5 shows a top view of an anode side of the separator plate 14" with a sealant M in the fuel inlet 131 and in the fuel outlet 151. The sealants M prevent fuel from penetrating through the fuel inlet 131 or through the fuel outlet 151 into the flow field 142". Thereby, it is prevented that fuel passes through the passage D into the oxidant path. In addition or as an alternative, a sealant M can likewise be arranged in the oxidant inlet or in the oxidant outlet. In order to seal the inlets or the outlets, for example, the sealant M could be supplied via an endoscopic tool. Furthermore, an injection device could be led from the outer edge R through the channels Z in order to apply the sealant M. For this purpose, it can be advantageous, if the distributor structures, 132, 152 are arranged and designed as disclosed in the German patent application with patent application number DE 102015215258.8 (there: manifold channel 130, 140) by the applicant. The contents of this patent application with regard to the distributor channels is made into an integral part of this patent application by reference.

REFERENCE LIST fuel cell stack 100
degraded individual cell 102;
individual cell 101, 102, 103, 104
bipolar plate 14, 14', 14", 14'''
MEA 12, 12', 12", 12'''
ion-selective separator, membrane 122'
catalyst layer 124', 125'
gas-diffusion layer 128', 129'
fuel supply channel 130
fuel inlet 131
distributor structure inlet 132
media channels 142', 144'
fuel discharge channel 150
fuel outlet 151
distributor structure outlet 152
passage D
sealant M
edge R The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for repairing a fuel cell stack having a plurality of individual cells, the method comprising the steps of:
    identifying at least one degraded individual cell of the fuel cell stack; and
    deactivating the at least one degraded individual cell, wherein
    an electrically conductive connection between two separator plates of the at least one degraded individual cell is generated through an ion-selective separator by applying a high voltage to the individual cell or to two or more directly adjacent individual cells, which generates a passage within the ion-selective separator.

2. The method as claimed in claim 1, wherein
    the high voltage is applied to the individual cell such that no current between intact individual cells flows by applying the high voltage.

3. The method as claimed in claim 2, wherein
    the high voltage is applied to the separator plates of the individual cell from the outer edge.

4. The method as claimed in claim 1, wherein
    the high voltage is applied to the separator plates of the individual cell from the outer edge.

5. The method as claimed in claim 1, wherein
    an individual cell is operated during deactivation.

6. The method as claimed in claim 1, wherein
    after generating the passage, after the breakdown of the ion-selective separator at least in sections, and/or after making the ion-selective separator electrically conductive at least in sections, operating the fuel cell stack such that contact surfaces enlarge.

7. The method as claimed in claim 6, wherein
    the contact surfaces enlarge while the passage is forming or enlarging.

8. The method as claimed in claim 5, wherein
the ion-selective separator heats up such that during operation of the individual cell that the ion-selective separator melts at least in sections.

9. The method as claimed in claim 1, wherein
the passage is formed such that fuel comes into contact with oxidant through the passage.

10. The method as claimed in claim 1, wherein
during the deactivating of the individual cell, oxidant on a cathode side has a lower level of oxygen than ambient air.

11. The method as claimed in claim 1, wherein
at least one media supply into the degraded individual cell and/or at least one media discharge out of the degraded individual cell is/are prevented, and a media inlet, a media outlet and/or their distributor structures is/are cast using a sealant.

12. The method as claimed in claim 11, wherein
the sealant is introduced into the media inlet, into the media outlet and/or into the distributor structures from an outer edge.

13. The method as claimed in claim 12, wherein
the sealant is introduced at a temperature, or during hardening of the sealant assumes such a temperature, which breaks down the ion-selective separator of the individual cell at least in sections.

14. The method as claimed in claim 11, wherein
the media supply is prevented by a tool introduced through the media supply channel;

the media discharge is prevented by a tool introduced through the media discharge channel; and/or a substance and/or a solvent is introduced by a tool introduced through the media discharge channel.

15. The method as claimed in claim 14, wherein
an electrical potential is applied to the degraded individual cell, and the tool identifies the degraded individual cell based on the electrical potential.

\* \* \* \* \*